(12) United States Patent
Kim

(10) Patent No.: US 12,633,565 B2
(45) Date of Patent: May 19, 2026

(54) ELECTRODE PLATE SPREADING DEVICE FOR SECONDARY BATTERY

(71) Applicant: SAMSUNG SDI CO., LTD., Yongin-si (KR)

(72) Inventor: Jaewoo Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 304 days.

(21) Appl. No.: 18/003,306

(22) PCT Filed: Jan. 27, 2022

(86) PCT No.: PCT/KR2022/001430
§ 371 (c)(1),
(2) Date: Jun. 5, 2023

(87) PCT Pub. No.: WO2022/169191
PCT Pub. Date: Aug. 11, 2022

(65) Prior Publication Data
US 2024/0030479 A1 Jan. 25, 2024

(30) Foreign Application Priority Data
Feb. 2, 2021 (KR) ........................ 10-2021-0014968

(51) Int. Cl.
*B25B 11/00* (2006.01)
*H01M 10/04* (2006.01)

(52) U.S. Cl.
CPC ... *H01M 10/0404* (2013.01); *H01M 10/0481* (2013.01)

(58) Field of Classification Search
CPC .......... H01M 10/0404; H01M 10/0481; B25B 11/00; B25B 11/02; B23Q 3/00; B23Q 3/06
See application file for complete search history.

(56) References Cited

U.S. PATENT DOCUMENTS 3,359,618 A * 12/1967 Murphy ................. B23P 19/02
29/283
6,546,609 B1 * 4/2003 Lee .......................... B21J 15/28
29/243.5
(Continued)

FOREIGN PATENT DOCUMENTS

JP 2015-106480 A 6/2015
JP 2015-159072 A 9/2015
(Continued)

OTHER PUBLICATIONS

International Search Report for PCT/KR2022/001430, May 11, 2022, 4 pp.

*Primary Examiner* — Lee D Wilson
(74) *Attorney, Agent, or Firm* — Womble Bond Dickinson (US) LLP

(57) ABSTRACT

An electrode plate spreading device of a rechargeable battery according to an embodiment of the present disclosure includes: a magazine stacking electrode plates in which one surface of a base substrate is an uncoated region and the other surface is a coated region, and are punched out and curled toward the base substrate; a bottom jig provided downwardly inside the magazine and supporting the electrode plates with a curvature supporting surface; a top jig provided above the magazine and having a curvature pressing surface to press the electrode plates; and a pressing member that presses the top jig and maintains the pressed state.

16 Claims, 7 Drawing Sheets

(56)          References Cited

U.S. PATENT DOCUMENTS

| | | | |
|---|---|---|---|
| 6,691,391 | B2 * | 2/2004 | Lin ..................... G11B 25/043 |
| 8,844,122 | B2 * | 9/2014 | Lin ..................... H01R 43/20 |
| | | | 29/747 |
| 10,170,785 | B2 * | 1/2019 | Ju ..................... H01M 8/248 |
| 11,702,246 | B2 * | 7/2023 | Cotton .................. A47J 47/14 |
| | | | 206/508 |
| 2006/0266734 | A1 * | 11/2006 | Fujii .................. B29C 59/02 |
| | | | 29/841 |
| 2007/0164494 | A1 * | 7/2007 | Chang ................. B25B 1/103 |
| | | | 269/43 |
| 2008/0159842 | A1 * | 7/2008 | Kang ................. H01M 8/244 |
| | | | 414/788.1 |

FOREIGN PATENT DOCUMENTS

| | | | | | |
|---|---|---|---|---|---|
| JP | 2016-062864 | A | | 4/2016 | |
| KR | 10-0784444 | B1 | | 12/2007 | |
| KR | 10-2012-0075299 | A | | 7/2012 | |
| KR | 10-1806236 | B1 | | 12/2017 | |
| KR | 10-1888207 | B1 | | 8/2018 | |
| WO | WO-2022169191 | A1 | * | 8/2022 | ........ H01M 10/0481 |

* cited by examiner

ELECTRODE PLATE SPREADING DEVICE FOR SECONDARY BATTERY

CROSS-REFERENCE TO RELATED APPLICATIONS

This application is a U.S. National Phase Patent Application of International Application Number PCT/KR2022/001430, filed on Jan. 27, 2022, which claims priority of Korean Patent Application Number 10-2021-0014968, filed on Feb. 2, 2021, the entire content of each of which is incorporated herein by reference.

TECHNICAL FIELD

The present disclosure relates to an electrode plate spreading device of a rechargeable battery. More particularly, the present disclosure relates to an electrode plate spreading device of a rechargeable battery that flattens an electrode plate bent toward a base substrate when an active material coated portion is formed on only one surface of the base substrate.

BACKGROUND ART

Rechargeable batteries are batteries which can be charged and discharged, unlike primary batteries. Low-capacity rechargeable batteries are used for small, portable electronics such as mobile phones, laptop computers, or camcorders. Large-capacity rechargeable batteries are widely used for power sources for driving motors of electric bicycles, scooters, electric vehicles, forklifts, etc.

The rechargeable battery includes an electrode assembly for charging and discharging a current, a case or a pouch for accommodating the electrode assembly and an electrolyte solution, and electrode terminals connected to the electrode assembly and drawn out of the case or pouch. The electrode assembly may be formed as a jelly roll type formed by winding an electrode plate and a separator or a stack type formed by stacking an electrode plate and a separator.

The rechargeable battery of the stack type uses one half cathode electrode plate (Half Cathode) at the top side and bottom side of the electrode assembly to maximize the capacity, respectively. The half cathode electrode plate forms an uncoated region on one surface and an active material coated region only on the other surface.

After forming the coated region, the half cathode electrode plate goes through a press process, and by this process, the coated region is stretched more than the uncoated region, thereby curling in which it is curved toward the uncoated region occurs.

In order to manufacture the electrode assembly, alignment is required when stacking the electrode plates, and it is necessary to improve the curling of the half cathode electrode plate for this purpose.

DISCLOSURE

Technical Problem

An embodiment of the present disclosure is to provide an electrode plate spreading device of a rechargeable battery that flattens an electrode plate bent toward the base substrate side by forming an uncoated region on one surface of the base substrate and a coated region on the other surface.

Technical Solution

An electrode plate spreading device of a rechargeable battery according to an embodiment of the present disclosure includes: a magazine stacking electrode plates in which one surface of a base substrate is an uncoated region and the other surface is a coated region, and are punched out and curled toward the base substrate; a bottom jig provided downwardly toward the inside of the magazine and supporting the electrode plates with a curvature supporting surface; a top jig provided above the magazine and having a curvature pressing surface to press the electrode plates; and a pressing member that presses the top jig and maintains the pressed state.

The top jig further may include a column formed in an opposite direction of the pressing surface, and the pressing member may be disposed across the top of the column.

The electrode plate spreading device of the rechargeable battery according to an embodiment of the present disclosure may further include a base where the magazine is installed, and a column installed in the base on both sides of the magazine.

The pressing member may be installed through the column to be movable up and down, adjust a pressure by an adjustment nut screwed into a bolt portion formed in a predetermined range on the top of the column, and maintain the pressure state.

The support surface of the bottom jig and the pressing surface of the top jig may have the same curvature.

The supporting surface of the bottom jig may be upwardly convex, and the pressing surface of the top jig may be concave downwardly and face the supporting surface.

The supporting surface of the bottom jig may be concave upwardly, and the pressing surface of the top jig may be convex downwardly and face the supporting surface.

The curvature of the bottom jig and the curvature of the top jig may be formed along the first direction.

The curvature of the bottom jig and the curvature of the top jig may be formed along a second direction crossing the first direction.

The curvature of the bottom jig and the curvature of the top jig may be formed along a first direction and be formed along a second direction crossing the first direction.

The electrode plate spreading device of the rechargeable battery according to an embodiment of the present disclosure may be preserved at a temperature of 30-150° C. after pressurizing the electrode plate.

The electrode plate spreading device of the rechargeable battery according to an embodiment of the present disclosure may be preserved at a temperature of 80-100° C. after pressurizing the electrode plate.

Advantageous Effects

The electrode plate spreading device of the rechargeable battery according to an embodiment of the present disclosure stacks electrode plates between the bottom jig and the top jig in the magazine and presses the top jig with the pressing member so that the electrode plate curled toward the base substrate may be spread flat.

That is, an embodiment improves quality of vision alignment of equipment when manufacturing the stack type of rechargeable battery through the improvement of the curling of the half cathode, and may improve a loss of the rechargeable battery manufacturing and poor alignment and cell safety.

MODE FOR INVENTION

Figure 1:
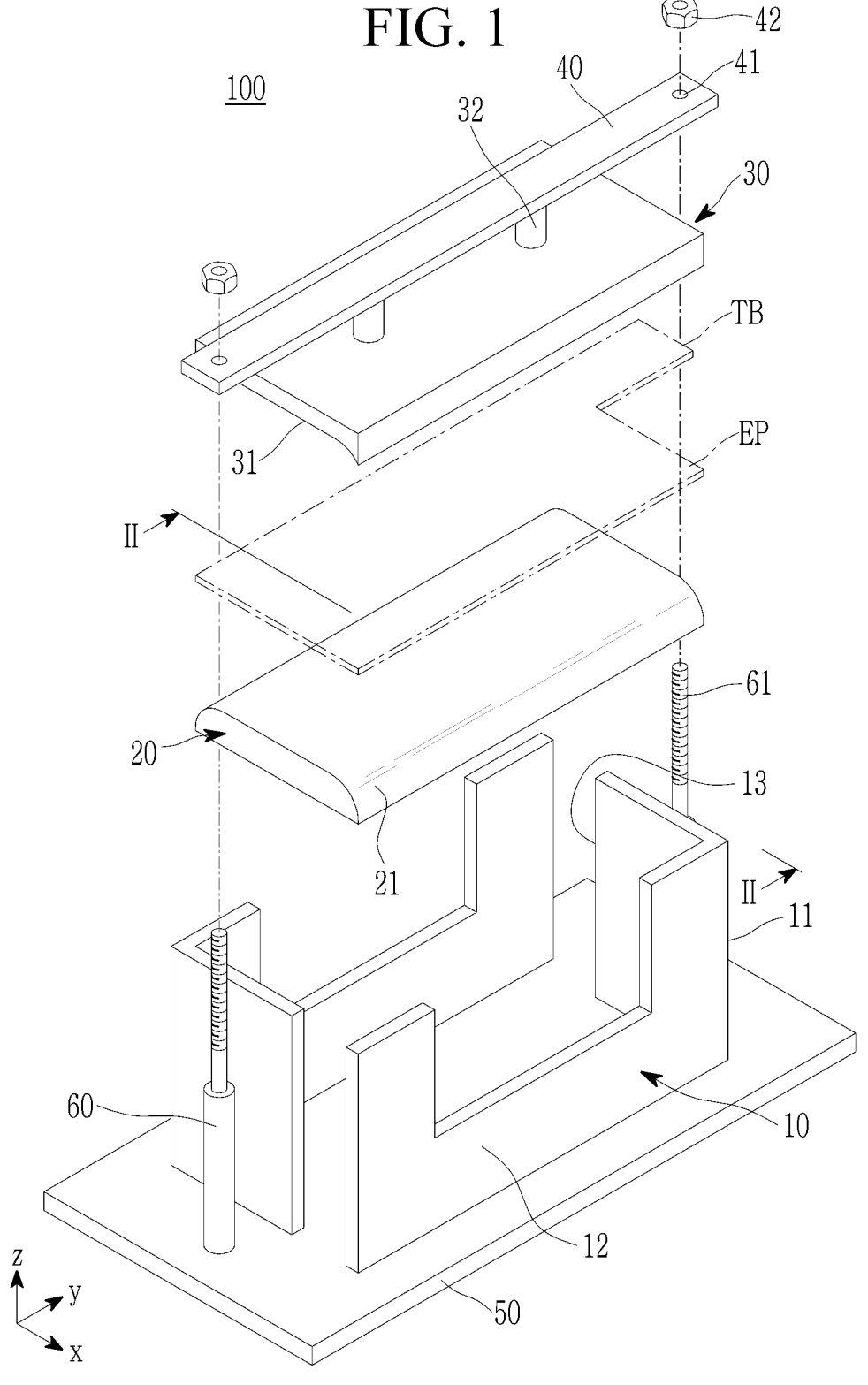
FIG. 1 is an exploded perspective view showing an electrode plate spreading device of a rechargeable battery according to a first embodiment of the present disclosure.

The present disclosure will be described more fully hereinafter with reference to the accompanying drawings, in which embodiments of the invention are shown. As those skilled in the art would realize, the described embodiments may be modified in various different ways, all without departing from the spirit or scope of the present disclosure. The drawings and description are to be regarded as illustrative in nature and not restrictive. Like reference numerals designate like elements throughout the specification.

Figure 2:
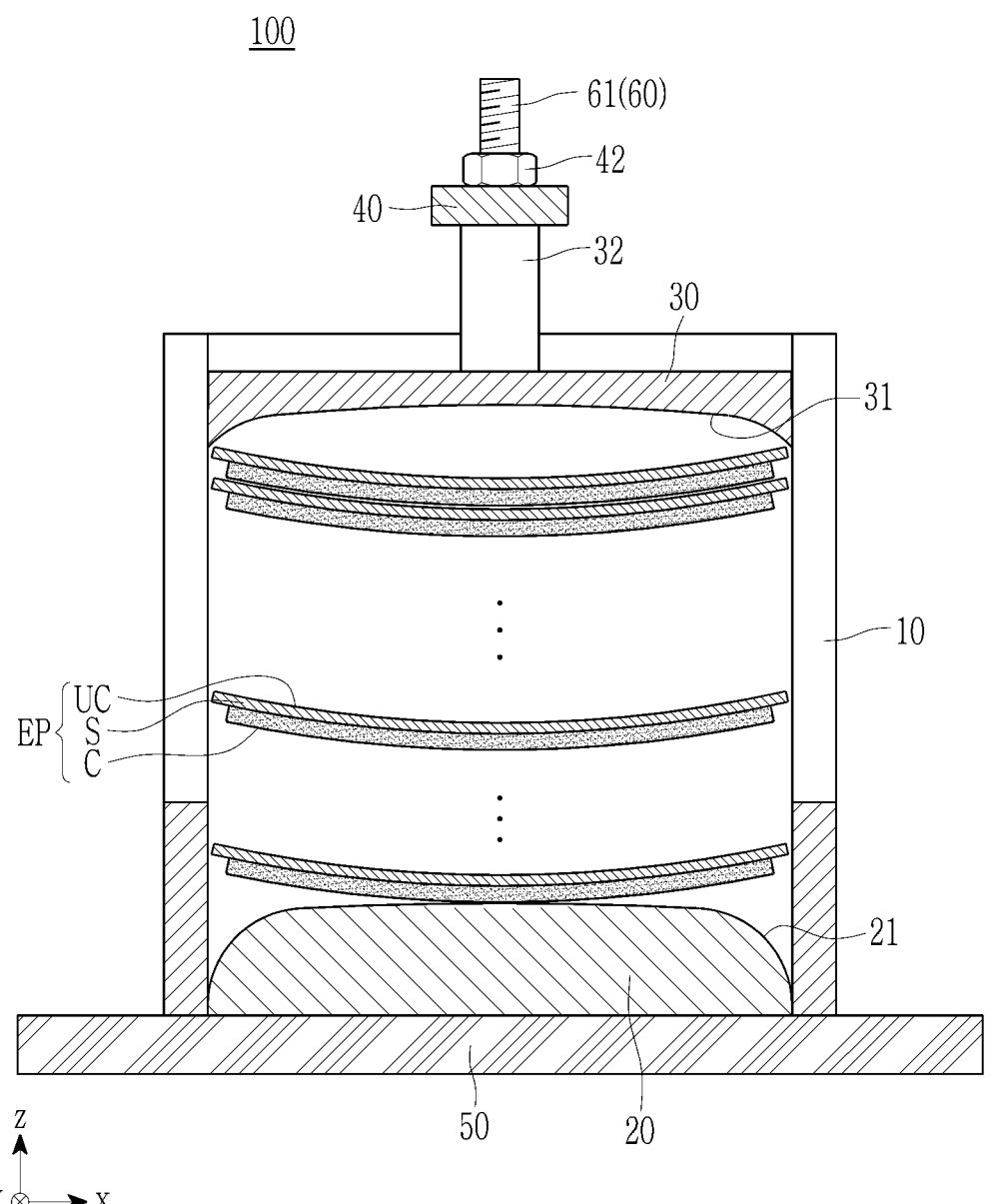
FIG. 2 is a cross-sectional view taken along a line II-II showing a state before a pressurization to stack and unfold electrode plates in a magazine of a device of FIG. 1.

FIG. 1 is an exploded perspective view showing an electrode plate spreading device of a rechargeable battery according to a first embodiment of the present disclosure, and FIG. 2 is a cross-sectional view taken along a line II-II showing a state before pressurization to stack and unfold electrode plates in a magazine of a device of FIG. 1.

Referring to FIG. 1 and FIG. 2, the electrode plate spreading device 100 of the first embodiment includes a magazine 10 stacking curled electrode plates EP, a bottom jig 20, a top jig 30, and a pressing member 40.

First, the rechargeable battery of the stack-type has double-sided electrode plates (not shown) that form regions coated with an active material on both sides of the base substrate, and further uses the present embodiment electrode plates EP of one sheet on the top and bottom sides of the electrode assembly to maximize capacity. That is, the capacity of the electrode assembly increases as much as the coated region C of the electrode plates EP of two sheets. The electrode plates EP may be a half cathode electrode plate (a half cathode).

The electrode plates EP form an uncoated region UC without coating an active material on one surface of the base substrate S and form a coated region C coated with the active material on the other surface, and are manufactured in a single sheet by a punching process. In the punched electrode plates EP, the coated region C is stretched more than the uncoated region UC through the press process for the base substrate S.

Typically, the electrode plates EP are formed as a rectangle, and may be formed as a square, circular, or oval shape (not shown). In the case of the rectangle, the electrode plate EP is curled in the x-axis direction (the short side of the electrode plate in FIG. 1) and the y-axis direction (the long side of the electrode plate in FIG. 1) toward the uncoated region UC side by the punching and pressing process.

The electrode plate spreading device 100 of the first embodiment is used to flatten the curling generated in the electrode plate EP. After the punching and pressing process, the curled electrode plates EP are stacked between the bottom jig 20 and the top jig 30 inside the magazine 10, and the curling is straightened by pressing the top jig 30 through the pressing member 40.

The magazine 10 forms the corner 11 to guide the stacking by accommodating the outer corners of the electrode plates EP to be stacked, and partially opens the side surfaces 12 connecting the corners 11 so that the stacking state of the electrode plates EP may be checked. In addition, the magazine 10 has an opening 13 on at least one side of the side surfaces 12 for the entire height direction range for drawing-out of a tab TB provided on the electrode plates EP.

The bottom jig 20 is provided below the inside of the magazine 10 and has a curvature supporting surface 21 to upwardly support the lower side of the stacked electrode plates EP. The bottom jig 20 is separated from and combined with the magazine 10, and has a predetermined curvature on the supporting surface 21. The curvature of the supporting surface 21 is formed in the direction opposite to the curling (to be downwardly convex in FIG. 2) of the electrode plates EP.

The top jig 30 is provided above the magazine 10 and presses the top of the stacked electrode plates EP downward with the pressing surface 31 with the curvature. The top jig 30 is separated from and combined with the magazine 10, and has a predetermined curvature on the pressing surface 31. The curvature of the pressing surface 31 is formed in the direction opposite to the curling of the electrode plates EP (to be upwardly concave in FIG. 2).

The pressing member 40 presses the top jig 30, and allows the pressurized state to be fixed and maintained for a predetermined time. Although not shown, the pressing member may be formed of a weight body having a weight capable of pressing the top jig.

The top jig 30 further includes a column 32 formed on the opposite side of the pressing surface 31. The pressing member 40 is disposed across the top of the column 32. The pressing member 40 is integrally formed with the column 32. Although not shown, the pressing member may be formed of a structure combined with and separated from the column.

The electrode plate spreading device 100 of the first embodiment may further include a base 50 and a column 60. The base 50 provides a flat bottom on which the magazine 10 is installed, and when the lower side of the magazine 10 forms an opened structure, a flat surface to install the bottom jig 20 is provided within the magazine 10. Therefore, the magazine 10 may be formed in an opened or closed structure on the lower side.

The column 60 is disposed on both sides of the magazine 10 and installed in the base 50. The column 60 forms a bonding structure with the pressing member 40 so that the pressing member 40 may continuously press the top jig 30 for a predetermined time.

The pressing member 40 is installed through install holes 41 provided at both ends to enable a height adjustment in the column 60, and is fixed to the column 60 by an adjusting nut 42 screwed into a bolt portion 61 formed on the upper part of the column 60 and adjusts the pressure force, and maintains the pressurized state.

The bolt portion 61 is formed in a predetermined length range at the upper part of the column 60. Therefore, it is possible to correspond to the height of the electrode plates EP stacked on the magazine 10, and after pressurizing the stacked electrode plates EP for a certain period of time, the adjustment nut 42 may be further tightened to further straighten the stacked electrode plates EP and further maintain the unfolded pressurized state.

Meanwhile, the supporting surface 21 of the bottom jig 20 and the pressing surface 31 of the top jig 30 may have the same curvature. The curvature of the supporting surface 21 and the pressing surface 31 is formed in the opposite direction to the curling of the electrode plates EP.

Figure 3:
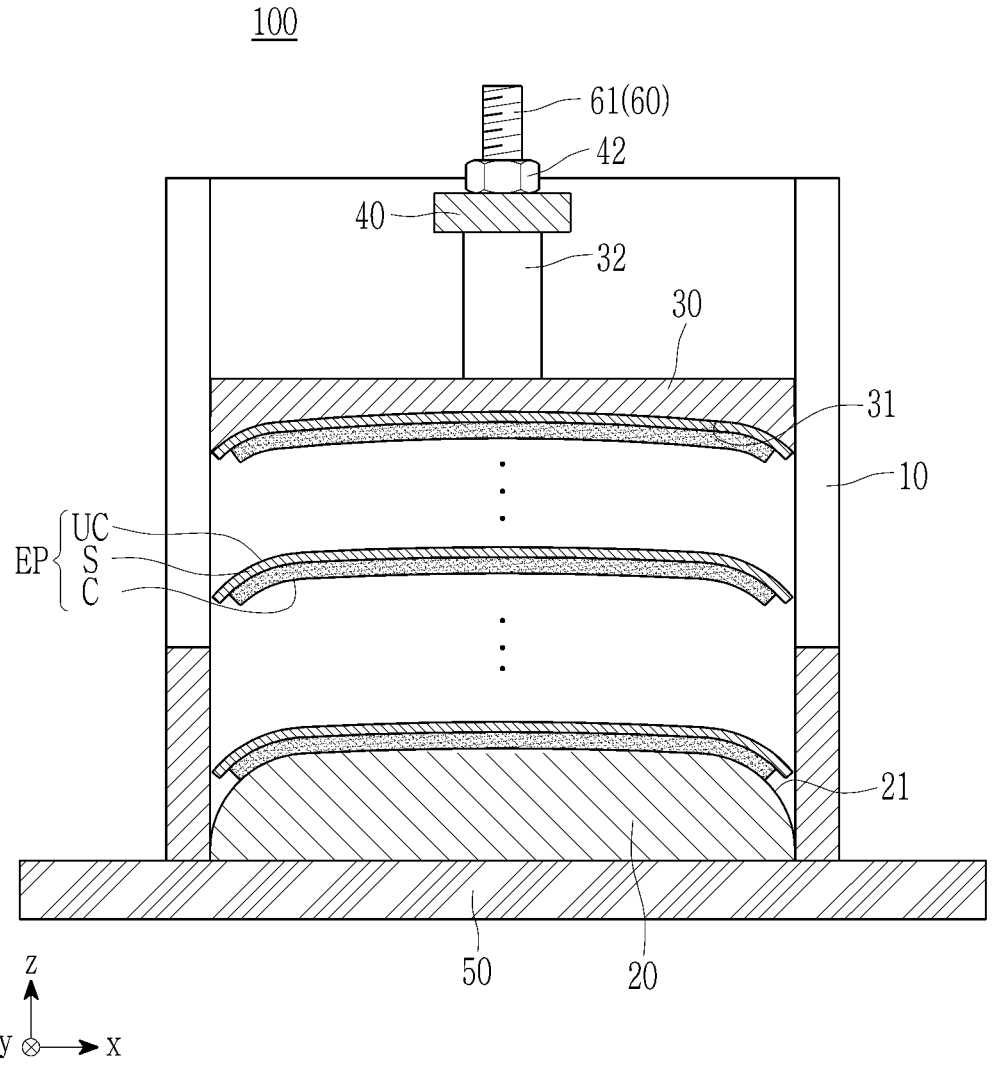
FIG. 3 is a cross-sectional view shown along a state after pressing in FIG. 2.

FIG. 3 is a cross-sectional view shown along a state after pressing in FIG. 2. Referring to FIG. 2 and FIG. 3, the supporting surface 21 of the bottom jig 20 is convex upwardly, and the pressing surface 31 of the top jig 30 is concave downwardly to face the supporting surface 21. The method of spreading the electrode plates EP by using the bottom jig 20 and the top jig 30 will be described.

First, the bottom jig 20 is installed on the magazine 10 on the base 50. At this time, the supporting surface 21 of the bottom jig 20 is in an upwardly convex state. Then, the electrode plates EP are put into the magazine 10 and stacked on the supporting surface 21 of the bottom jig 20. At this time, the downward convex curvature of the electrode plates EP opposes the upward convex curvature of the supporting surface 21. That is, the supporting surface 21 and the electrode plates EP have a curvature along the first direction (the x-axis direction).

The top jig 30 is installed on the electrode plates EP in the magazine 10. At this time, the pressing surface 31 of the top jig 30 is in a concave downward state. At this time, the upward concave curvature of the electrode plates EP opposes the downward concave curvature of the pressing surface 31. That is, the pressing surface 31 and the electrode plates EP have the curvature along the first direction (the x-axis direction).

By combining the install hole 41 of the pressing member 40 to the bolt portion 61 of the column 60 and tightening the adjustment nut 42 to the bolt portion 61, the pressing member 40 presses the electrode plates EP through the top jig 30 (referring to FIG. 3). That is, the supporting surface 21, the electrode plates EP, and the pressing surface 31 have a curvature along the first direction (the x-axis direction), and have a reversed first direction (x-axis direction) curvature.

The electrode plate spreading device 100 of the rechargeable battery is preserved at a temperature of 30-150° C. in the pressurized state of FIG. 3, that is, after pressurizing the electrode plate EP. In addition, the electrode plate spreading device 100 of the rechargeable battery may be preserved at a temperature of 80-100° C. after pressurizing the electrode plate EP.

Then, the pressing member 40 is removed from the column 60 by unscrewing the adjustment nut 42 from the bolt portion 61. Accordingly, the top jig 30 releases the pressure of the electrode plates EP. That is, as the curvature reversed by the supporting surface 21 and the pressing surface 31 is partially recovered to the initial curvature direction, the electrode plates EP become flat. That is, the curvature formed along the first direction (the x-axis direction) is stretched.

Therefore, the electrode plate spreading device 100 of the first embodiment may improve the quality of vision alignment of equipment when manufacturing the rechargeable battery of the stack type by improving the curling of the electrode plates EP, and improve a rechargeable battery manufacturing loss, misalignment, and cell safety.

Hereinafter, various embodiments of the present disclosure will be described. For embodiments comparing with the first embodiment and the previously described embodiment, the description of the same configurations is omitted, and the description of the different configurations is described.

Figure 4:
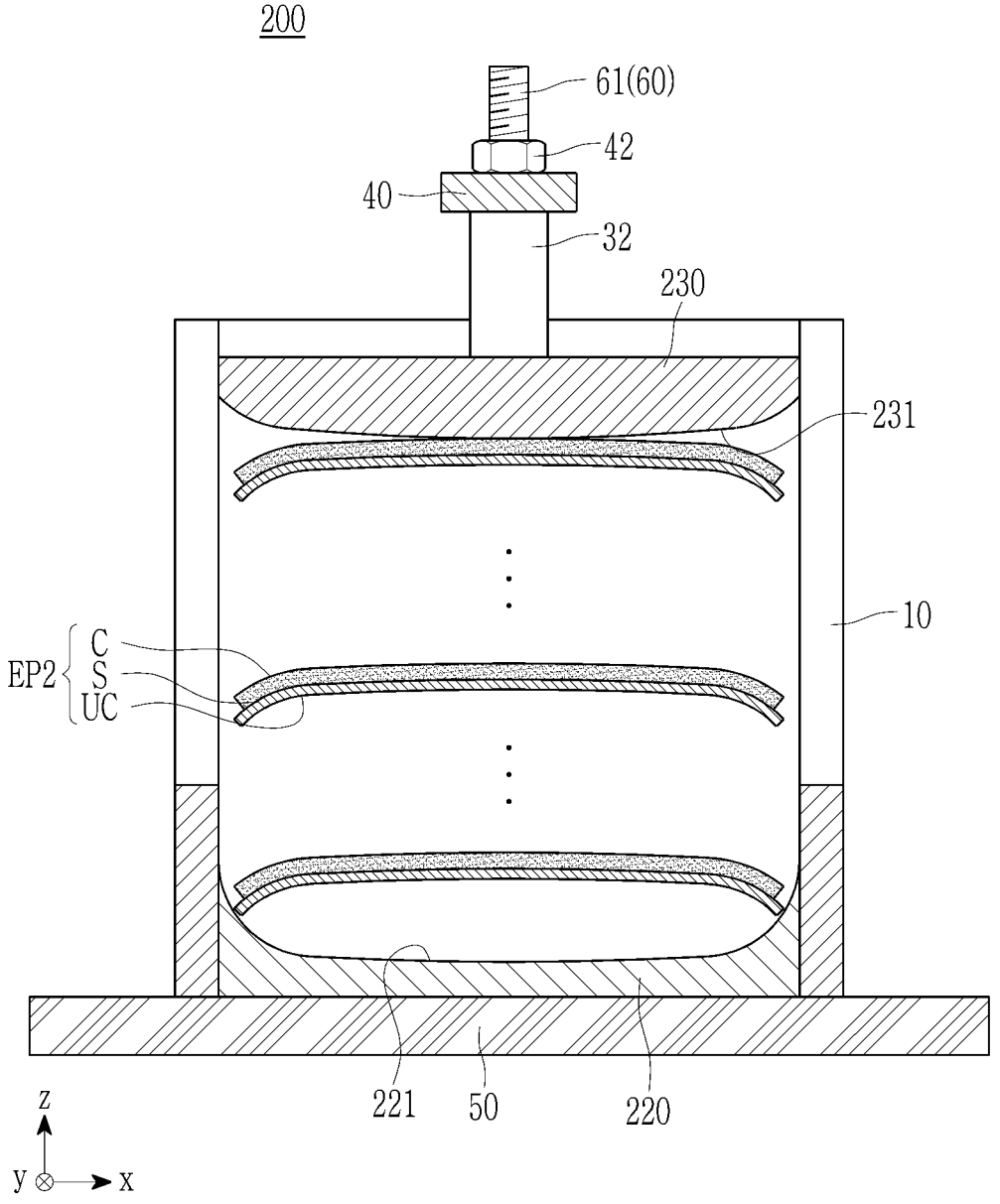
FIG. 4 is a cross-sectional view showing a state before pressurization to stack and unfold electrode plates in a magazine of an electrode plate spreading device of a rechargeable battery according to a second embodiment of the present disclosure.
Figure 5:
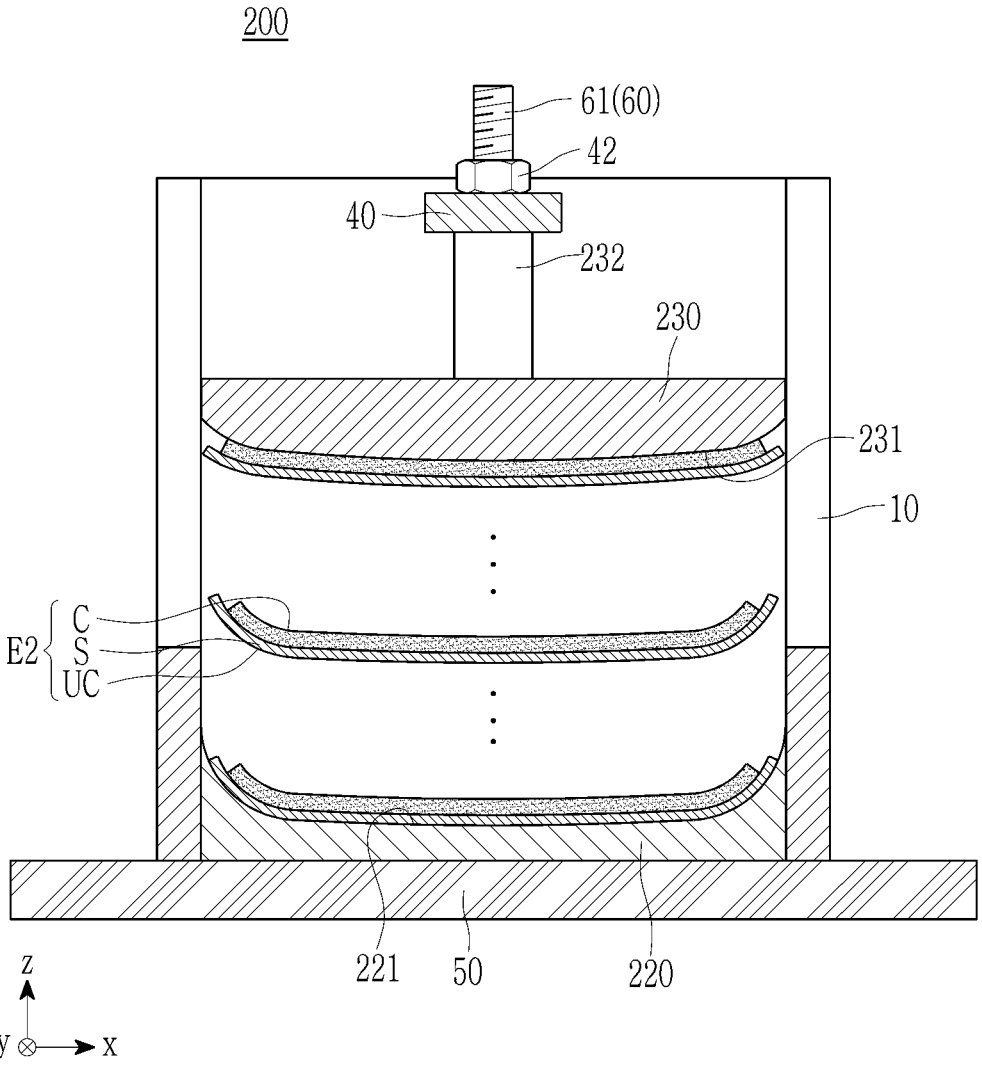
FIG. 5 is a cross-sectional view shown along a state after pressing in FIG. 4.

FIG. 4 is a cross-sectional view showing a state before pressurization to stack and unfold electrode plates in a magazine of an electrode plate spreading device of a rechargeable battery according to a second embodiment of the present disclosure, and FIG. 5 is a cross-sectional view shown along a state after pressing in FIG. 4.

Referring to FIG. 4 and FIG. 5, in the electrode plate spreading device 200 of the second embodiment, the supporting surface 221 of the bottom jig 220 is concave upwardly, and the pressing surface 231 of the top jig 230 is convex downwardly while facing the supporting surface 221. The method of spreading the electrode plates EP2 by using the bottom jig 220 and the top jig 230 will be described.

First, the bottom jig 220 is installed on the magazine 10 on the base 50. At this time, the supporting surface 221 of the bottom jig 220 is in an upwardly concave state. Then, the electrode plates EP2 are put into the magazine 10 and stacked on the supporting surface 221 of the bottom jig 220. At this time, the downward concave curvature of the electrode plates EP2 opposes the upward concave curvature of the supporting surface 221. That is, the supporting surface 221 and the electrode plates EP2 have a curvature along the first direction (the x-axis direction).

The top jig 230 is installed on the electrode plates EP2 in the magazine 10. At this time, the pressing surface 231 of the top jig 230 is in a downwardly convex state. At this time, the upwardly convex curvature of the electrode plates EP2 opposes the downwardly convex curvature of the pressing surface 231. That is, the pressing surface 231 and the electrode plates EP2 have a curvature along the first direction (the x-axis direction).

By combining the install hole 41 of the pressing member 40 to the bolt portion 61 of the column 60 and tightening the adjustment nut 42 to the bolt portion 61, the pressing member 40 presses the electrode plates EP2 through the top jig 230 (referring to FIG. 5). That is, the supporting surface 221, the electrode plates EP2, and the pressing surface 231 have a curvature along the first direction (the x-axis direction), but have a reversed first direction (the x-axis direction) curvature.

The electrode plate spreading device 200 of the rechargeable battery is is left at 30-150° C. in the pressurized state of FIG. 5, that is, after pressurizing the electrode plate EP2. Also, the electrode plate spreading device 200 of the rechargeable battery may be left at 80-100° C. after pressurizing the electrode plate EP2.

Then, the pressing member 40 is removed from the column 60 by unscrewing the adjustment nut 42 from the bolt portion 61. As a result, the top jig 230 releases the pressure of the electrode plates EP2. That is, as the curvature reversed by the supporting surface 221 and the pressing surface 231 is partially recovered to the initial curvature direction, the electrode plates EP2 become flat.

Figure 6:
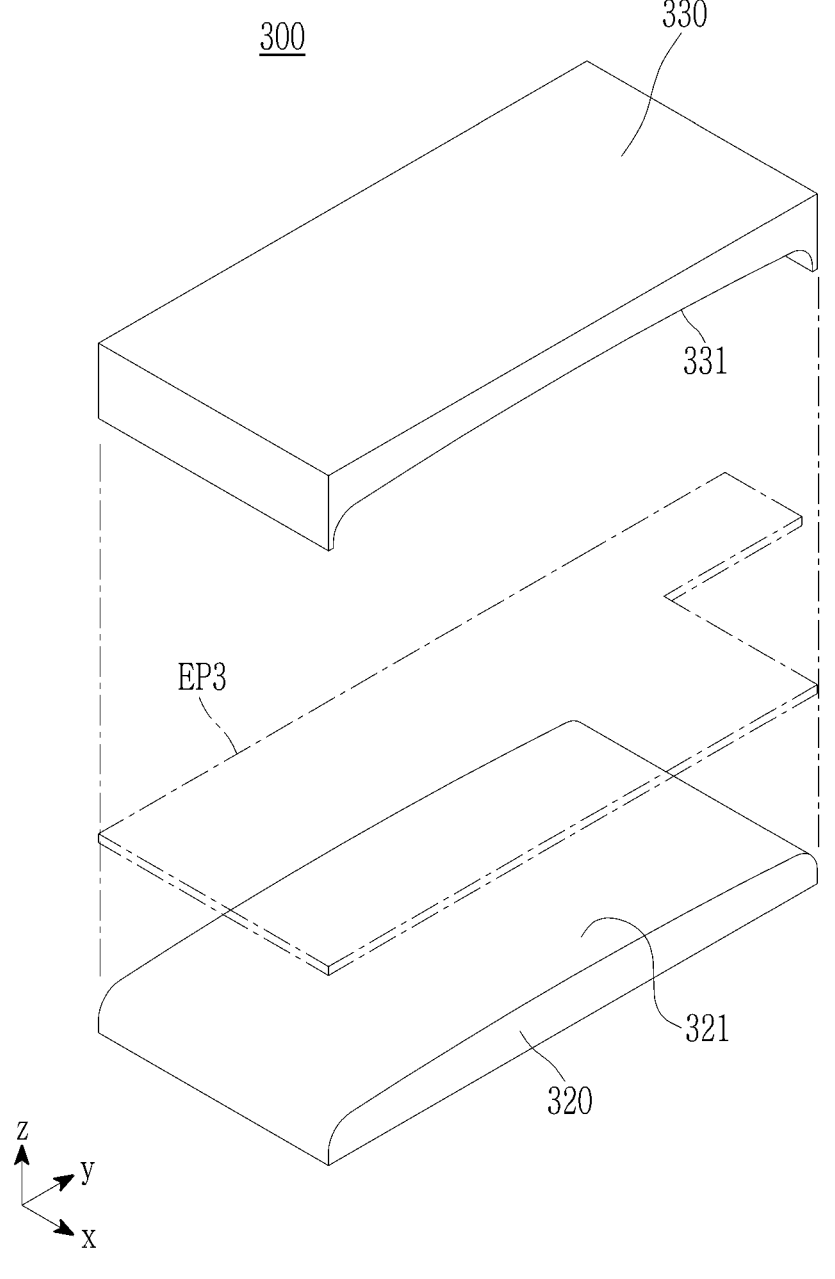
FIG. 6 is a perspective view of a bottom jig and a top jig applied to an electrode plate spreading device of a rechargeable battery according to a third embodiment of the present disclosure.

FIG. 6 is a perspective view of a bottom jig and a top jig applied to an electrode plate spreading device of a rechargeable battery according to a third embodiment of the present disclosure. Referring to FIG. 6, in the electrode plate spreading device 300 of the third embodiment, the curvature of the bottom jig 320 and the curvature of the top jig 330 is formed along a second direction (a y-axis direction) crossing the first direction (the x-axis direction).

The supporting surface 321, the electrode plates EP3, and the pressing surface 331 have a curvature along the second direction (the y-axis direction), but when the electrode plates EP3 are pressed through the top jig 330, they have the reversed second direction (the y-axis direction) curvature.

Figure 7:
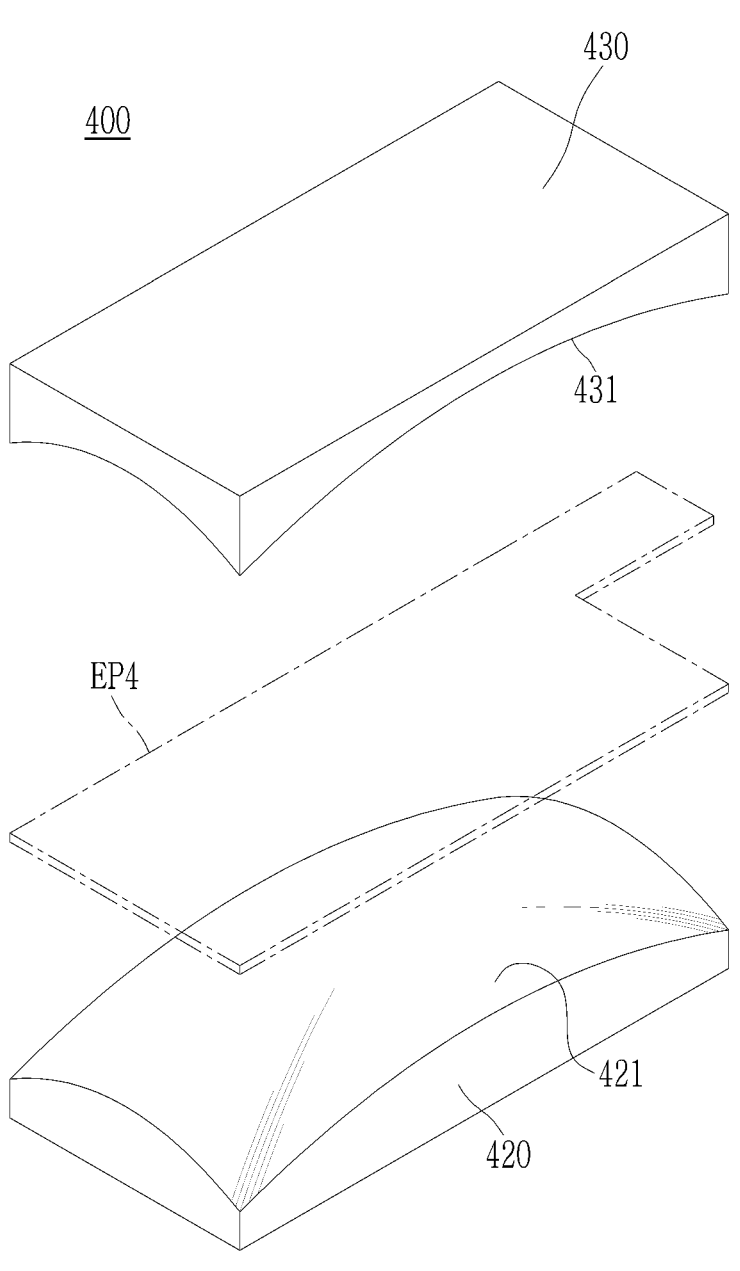
FIG. 7 is a perspective view of a bottom jig and a top jig applied to an electrode plate spreading device of a rechargeable battery according to a fourth embodiment of the present disclosure.
Figure 7:
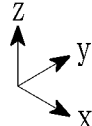

FIG. 7 is a perspective view of a bottom jig and a top jig applied to an electrode plate spreading device of a rechargeable battery according to a fourth embodiment of the present disclosure. Referring to FIG. 7, in the electrode plate spreading device 400 of the fourth embodiment, the curvature of the bottom jig 420 and the curvature of the top jig 430 are formed along the first direction (the x-axis direction) and are formed along the second direction (the y-axis direction) crossing the first direction (the x-axis direction).

The supporting surface 421, the electrode plates EP4, and the pressing surface 431 have a curvature along the first and second directions (the x and y axis directions), and when the electrode plates (not shown) are pressed through the top jig 430, the reversed first and second direction (the x and y axis directions) curvature are formed.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

| (Description of Symbols) | |
|---|---|
| 10: magazine | 11: corner |
| 12: side surface | 20, 220, 320, 420: bottom jig |
| 21, 221, 321, 421: supporting surface | 30, 230, 330, 430: top jig |
| 31, 231, 331, 431: pressing surface | 32: column |
| 40: pressing member | 41: install hole |
| 42: adjustment nut | 50: base |
| 60: column | 61: bolt portion |
| 100, 200, 300, 400: electrode plate spreading device | |
| C: coated region | EP, EP2, EP3, EP4: electrode plate |
| S: base substrate | TB: tab |
| UC: uncoated region | |

The invention claimed is:

1. An electrode plate spreading device of a rechargeable battery, comprising:

a magazine configured to receive and stack a plurality of electrode plates, each having one surface of a base substrate as an uncoated region and the other surface as a coated region, the electrode plates being punched out and curled toward the base substrate;

a bottom jig provided downwardly inside the magazine and supporting the electrode plates with a curved supporting surface;

a top jig provided above the magazine and having a curved pressing surface to press the electrode plates; and a pressing member that presses the top jig and maintains the pressed state, wherein the supporting surface of the bottom jig is upwardly convex, and the pressing surface of the top jig is concave downwardly and faces the supporting surface.

2. The electrode plate spreading device of the rechargeable battery as claimed in claim 1, wherein the top jig further includes a column formed in an opposite direction of the pressing surface, and the pressing member is disposed across the top of the column.

3. The electrode plate spreading device of the rechargeable battery as claimed in claim 1, further comprising:

a base where the magazine is installed; and a column installed in the base on both sides of the magazine.

4. The electrode plate spreading device of the rechargeable battery as claimed in claim 3, wherein the pressing member is installed through the column to be movable up and down, adjusts a pressure by an adjustment nut screwed into a bolt portion formed in a predetermined range on the top of the column, and maintains the pressure state.

5. The electrode plate spreading device of the rechargeable battery as claimed in claim 1, wherein the supporting surface of the bottom jig and the pressing surface of the top jig have the same curvature.

6. The electrode plate spreading device of the rechargeable battery as claimed in claim 1, wherein the curvature of the bottom jig and the curvature of the top jig are formed along a first direction.

7. The electrode plate spreading device of the rechargeable battery as claimed in claim 1, wherein the curvature of the bottom jig and the curvature of the top jig are formed along a second direction crossing a first direction.

8. The electrode plate spreading device of the rechargeable battery as claimed in claim 1, wherein the curvature of the bottom jig and the curvature of the top jig are formed along a first direction and are formed along a second direction crossing the first direction.

9. An electrode plate spreading device of a rechargeable battery, comprising:

a magazine configured to receive and stack a plurality of electrode plates, each having one surface of a base substrate as an uncoated region and the other surface as a coated region, the electrode plates being punched out and curled toward the base substrate;

a bottom jig provided downwardly inside the magazine and supporting the electrode plates with a curved supporting surface;

a top jig provided above the magazine and having a curved pressing surface to press the electrode plates; and a pressing member that presses the top jig and maintains the pressed state, wherein the supporting surface of the bottom jig is concave upwardly, and the pressing surface of the top jig is convex downwardly and faces the supporting surface.

10. The electrode plate spreading device of the rechargeable battery as claimed in claim 9, wherein the top jig further includes a column formed in an opposite direction of the pressing surface, and the pressing member is disposed across the top of the column.

11. The electrode plate spreading device of the rechargeable battery as claimed in claim 9, further comprising:

a base where the magazine is installed; and a column installed in the base on both sides of the magazine.

12. The electrode plate spreading device of the rechargeable battery as claimed in claim 11, wherein the pressing member is installed through the column to be movable up and down, adjusts a pressure by an adjustment nut screwed into a bolt portion formed in a predetermined range on the top of the column, and maintains the pressure state.

13. The electrode plate spreading device of the rechargeable battery as claimed in claim 9, wherein the supporting surface of the bottom jig and the pressing surface of the top jig have the same curvature.

14. The electrode plate spreading device of the rechargeable battery as claimed in claim 9, wherein the curvature of the bottom jig and the curvature of the top jig are formed along a first direction.

15. The electrode plate spreading device of the rechargeable battery as claimed in claim 9, wherein the curvature of the bottom jig and the curvature of the top jig are formed along a second direction crossing a first direction.

16. The electrode plate spreading device of the rechargeable battery as claimed in claim 9, wherein the curvature of the bottom jig and the curvature of the top jig are formed along a first direction and are formed along a second direction crossing the first direction.

\* \* \* \* \*